United States Patent
Ogawa et al.

(10) Patent No.: US 8,601,303 B2
(45) Date of Patent: Dec. 3, 2013

(54) STORAGE SYSTEM

(75) Inventors: Junichi Ogawa, Kawasaki (JP); Yuichi Sakagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 12/908,301

(22) Filed: Oct. 20, 2010

(65) Prior Publication Data

US 2011/0099391 A1 Apr. 28, 2011

(30) Foreign Application Priority Data

Oct. 23, 2009 (JP) ................................ 2009-244700

(51) Int. Cl.
*G06F 1/00* (2006.01)

(52) U.S. Cl.
USPC .......................................... 713/323; 713/310

(58) Field of Classification Search
USPC .................................................. 713/300–340
See application file for complete search history.

(56) References Cited

U.S. PATENT DOCUMENTS

| | | | |
|---|---|---|---|
| 5,097,439 A * | 3/1992 | Patriquin et al. ................... 711/2 |
| 7,058,823 B2 * | 6/2006 | Lapidus ......................... 713/300 |
| 7,546,478 B2 | 6/2009 | Kubo et al. |
| 7,634,667 B2 * | 12/2009 | Weaver et al. ................. 713/300 |
| 7,644,293 B2 * | 1/2010 | Sistla et al. ................... 713/323 |
| 7,698,574 B2 * | 4/2010 | Morimoto et al. ............. 713/300 |
| 7,840,820 B2 * | 11/2010 | Shimada ........................ 713/300 |
| 2001/0033261 A1 * | 10/2001 | Washio et al. .................. 345/87 |
| 2002/0120878 A1 * | 8/2002 | Lapidus ......................... 713/300 |
| 2003/0135801 A1 * | 7/2003 | Chevallier ..................... 714/724 |
| 2003/0212916 A1 * | 11/2003 | Ito et al. ......................... 713/322 |
| 2009/0006877 A1 * | 1/2009 | Lubbers et al. ............... 713/323 |

FOREIGN PATENT DOCUMENTS

| | | |
|---|---|---|
| JP | 2004-356664 A | 12/2004 |
| JP | 2005-250739 A | 9/2005 |
| JP | 2007-503791 A | 2/2007 |
| JP | 2007-213584 A | 8/2007 |
| JP | 2008-243148 A | 10/2008 |
| WO | WO-2004/105317 | 12/2004 |

OTHER PUBLICATIONS

JP-2008-243148, Date of publication of application : Oct. 9, 2008, machine translation by JPO, pp. 1-18.*
JP-2004-356664, Date of publication of application : Dec. 16, 2004, machine translation by JPO, pp. 1-21.*
Japanese Office Action dated Sep. 20, 2011 for corresponding Japanese Application No. 2009-244700, with Partial English-language Translation.
Japanese Office Action mailed May 22, 2012 for corresponding Japanese Application No. 2009- 244700, with Partial English-language Translation.

\* cited by examiner

*Primary Examiner* — Tim T Vo
*Assistant Examiner* — Trisha Vu
(74) *Attorney, Agent, or Firm* — Fujitsu Patent Center

(57) ABSTRACT

A storage system includes: a basic apparatus for transmitting an access request through a data input line for transmitting data; and an extension apparatus for receiving an access request from the basic apparatus through the data input line, the extension apparatus including a storage for storing data and a controller for controlling the access request from the basic apparatus, wherein the basic apparatus superimposes a voltage to the data input line in accordance with the access request, and wherein the extension apparatus includes an upper input voltage detector for detecting the voltage superimposed on the upper data input line and includes a power controller for controlling the power supply to the controller on the basis of the detected voltage.

6 Claims, 8 Drawing Sheets

STORAGE SYSTEM

CROSS-REFERENCE TO RELATED APPLICATION

This application is based upon and claims the benefit of priority of the prior Japanese Patent Application No. 2009-244700 filed on Oct. 23, 2009, the entire contents of which are incorporated herein by reference.

FIELD

The embodiments discussed herein are related to storage systems.

BACKGROUND

A technology has been known which allows one information processing apparatus to start another information processing apparatus in a system containing a plurality of connected information processing apparatuses. Examples of the system containing a plurality of connected information processing apparatuses include a storage system containing a basic apparatus and an extension apparatus, which are connected to each other. The basic apparatus controls an access request from an external apparatus. The extension apparatus controls an access request from the basic apparatus to a storage within the extension apparatus.

In order to add a storage to a storage system, an extension apparatus may be connected to a basic apparatus. The extension apparatus to be added may be connected by serial connection, for example. In a storage system containing an extension apparatus connected to a basic apparatus, the basic apparatus can desirably start the extension apparatus.

In order for the basic apparatus to start an extension apparatus, a special line for power control may be provided between the basic apparatus and the extension apparatus. Alternatively, a controller may run at all times within the extension apparatus. In this case, the controller connected communicably to the basic apparatus, controls accesses to a storage apparatus within the extension apparatus and starts a storage on the basis of communication with the basic apparatus. When an extension apparatus is serially connected to the basic apparatus, the started extension apparatus may start the subsequently connected extension apparatus and sequentially start a plurality of extension apparatuses.

Japanese Laid-open Patent Publication (Translation of PCT Application) No. 2007-503791 and Japanese Laid-open Patent Publication No. 2005-250739 are examples of related art.

However, a communication interface between the basic apparatus and an extension apparatus may not always have a signal for power control. Thus, when a communication interface without a signal for power control is used, a special line for power control may not be provided between the basic apparatus and an extension apparatus as described above.

Within an extension apparatus, an unignorable amount of power may be consumed by operations by a controller that is communicably connected to the basic apparatus and controls accesses to a storage apparatus within the extension apparatus.

In this way, the technology in the past may not sufficiently suppress the power consumption at a standby state in a communication interface without a signal for power control.

The disclosed art was made in view of the aforementioned situations, and it is an object of the present invention to provide a storage system, storage apparatus and storage-apparatus starting method that suppress power consumption at a standby state and allows power interlocking between apparatuses, without using a signal for power control.

SUMMARY

According to an aspect of the embodiment, a storage system includes: a basic apparatus for transmitting an access request through a data input line for transmitting data; and an extension apparatus for receiving an access request from the basic apparatus through the data input line, the extension apparatus including a storage for storing data and a controller for controlling the access request from the basic apparatus, wherein the basic apparatus superimposes a voltage to the data input line in accordance with the access request, and wherein the extension apparatus includes an upper input voltage detector for detecting the voltage superimposed on the upper data input line and includes a power controller for controlling the power supply to the controller on the basis of the detected voltage.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With reference to drawings, embodiments of a storage system disclosed in the present application will be described in detail below. The present invention is not limited by the embodiments described below.

[First Embodiment]

Figure 1:
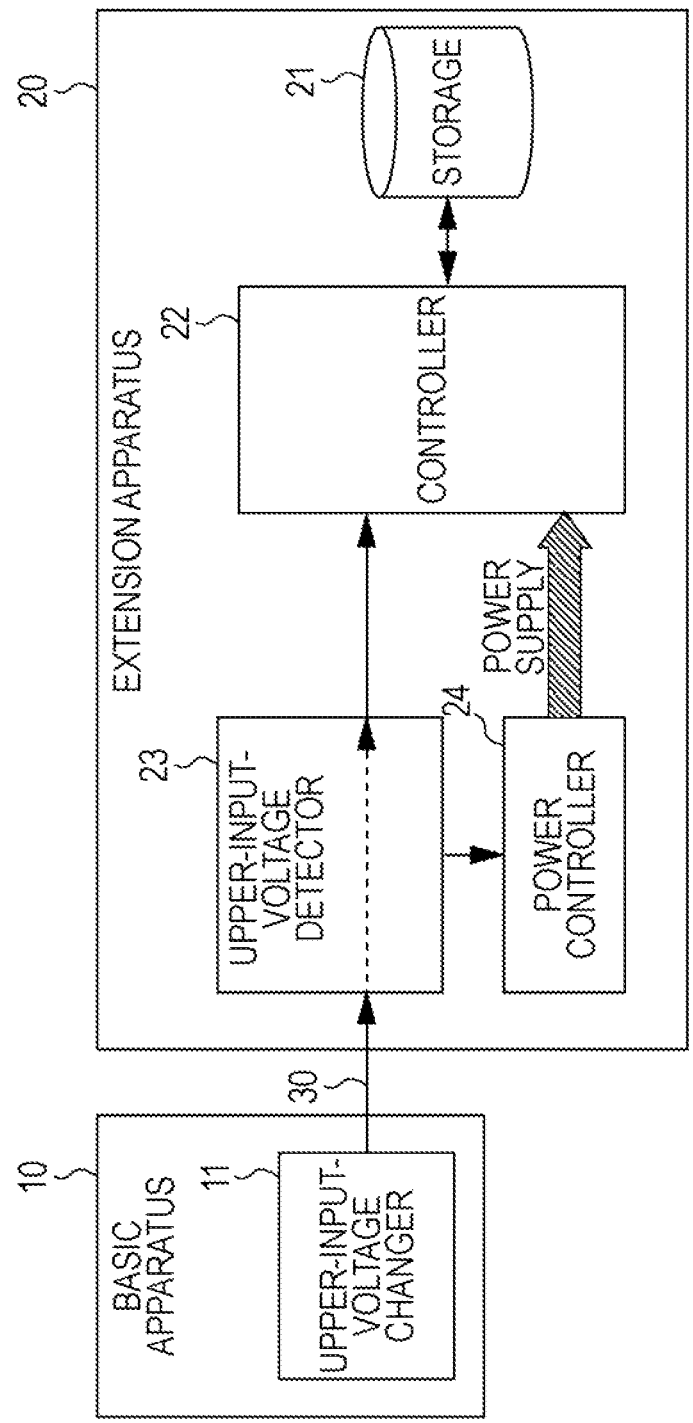
FIG. 1 is a system configuration diagram illustrating a configuration of a storage system according to a first embodiment of the present invention.

A first embodiment of the present invention will be described first. FIG. 1 is a system configuration diagram illustrating a configuration of a storage system according to the first embodiment. As illustrated in FIG. 1, a storage system according to the first embodiment includes a basic apparatus 10 and an extension apparatus 20. The basic apparatus 10 controls an external access request. The extension apparatus 20 is connected communicably to the basic apparatus 10. The extension apparatus 20 includes a controller 22 that controls an access request from the basic apparatus 10 to a storage 21 within the extension apparatus.

Here, the basic apparatus 10 has an upper-input-voltage changer 11. The upper-input-voltage changer 11 changes the voltage in an upper data input line 30 that transmits data to be input from the basic apparatus 10 to the extension apparatus 20 from a reference value.

The extension apparatus 20 has an upper-input-voltage detector 23 and a power controller 24. The upper-input-voltage detector 23 detects a change in voltage in the upper data input line 30. The power controller 24 controls power supply to the controller 22 on the basis of the change in voltage detected by the upper-input-voltage detector 23.

In other words, in the storage system according to the first embodiment, the extension apparatus 20 monitors a signal line for data transmission. When the basic apparatus 10 changes the voltage in the signal line from a reference value, the extension apparatus 20 controls power supply to the controller 22 on the basis of the change in voltage. Thus, according to the first embodiment, the power consumption at a standby state can be suppressed, and power interlocking between apparatuses can be implemented, without using a signal for power control.

[Second Embodiment]

Figure 2:
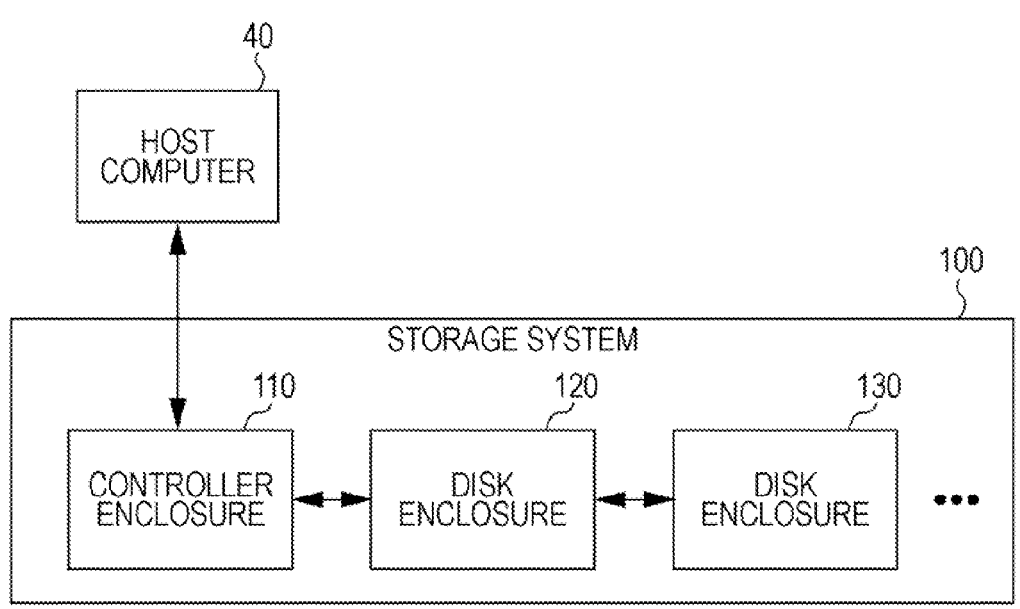
FIG. 2 is a system configuration diagram illustrating a configuration of a storage system according to a second embodiment of the present invention.

A second embodiment of the present invention will be described next. FIG. 2 is a system configuration diagram illustrating a configuration of a storage system according to the second embodiment. As illustrated in FIG. 2, a storage system 100 according to the second embodiment includes a controller enclosure 110, a disk enclosure 120, and a disk enclosure 130. The controller enclosure 110 is one embodiment of the basic apparatus. The disk enclosure 130 is one embodiment of the extension apparatus.

The storage system 100 includes a plurality of disk enclosures, not shown in FIG. 2, in addition to the disk enclosures 120 and 130. In the storage system 100, a plurality of disk enclosures are connected to the controller enclosure 110 in a multi-stage manner.

The controller enclosure 110 controls an access request transmitted from an apparatus external to the storage system 100. For example, the controller enclosure 110 controls an access request transmitted from a host computer 40 connected thereto over a network.

The disk enclosure 120 accommodates a plurality of hard disk drives (HDDs) that store data. The disk enclosure 120 is connected communicably to the controller enclosure 110 and controls an access request from the controller enclosure 110 to an HDD within the disk enclosure 120. The disk enclosure 120 is further connected communicably to the disk enclosure 130 and relays an access request to the disk enclosure 130 and other disk enclosures.

According to the second embodiment, data are transmitted through serial communication with serial attached SCSI (SAS) between the controller enclosure 110 and the disk enclosure 120 and between neighboring disk enclosures.

Figure 3:
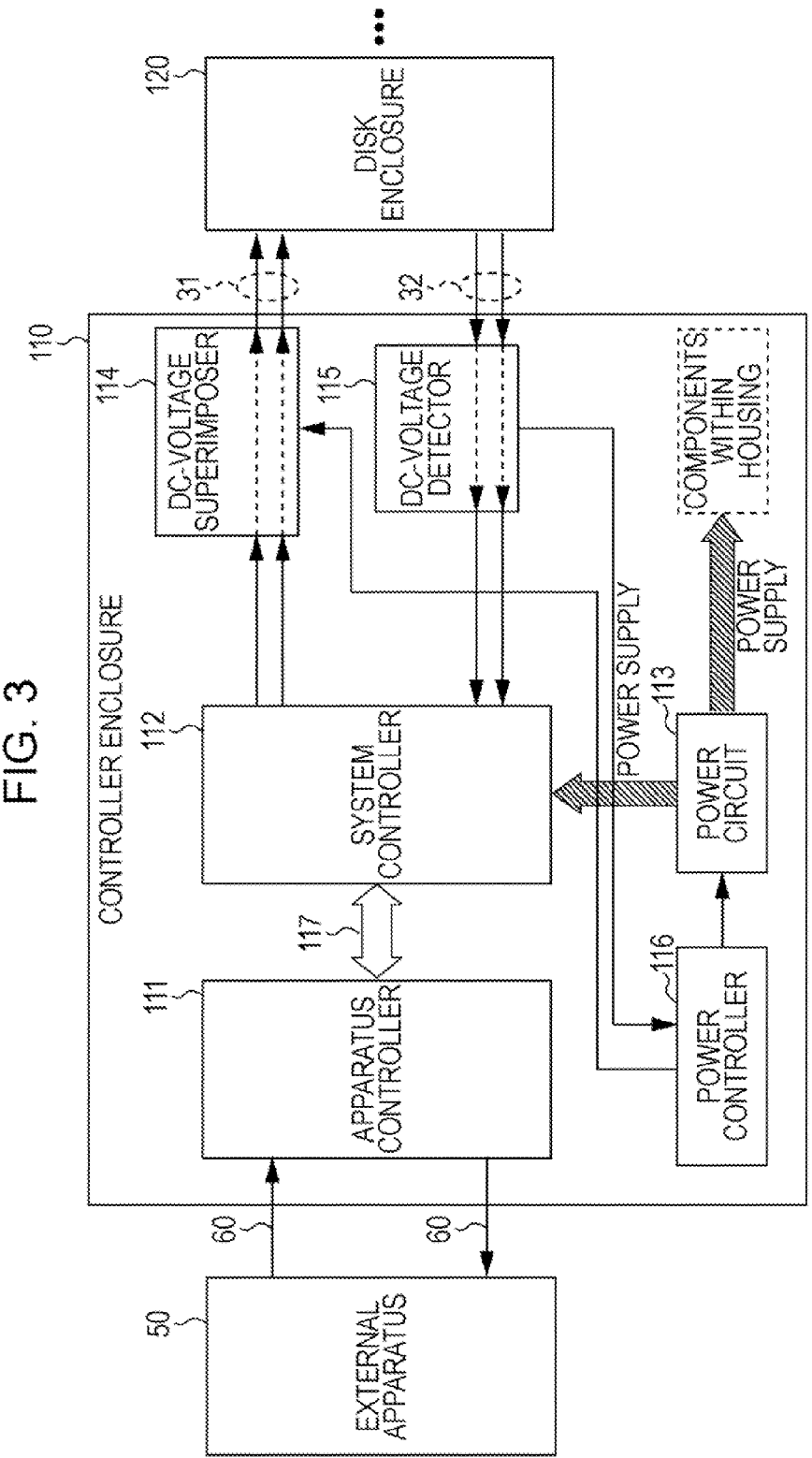
FIG. 3 is a functional block diagram illustrating a configuration of a controller enclosure according to the second embodiment.

Next, a configuration of the controller enclosure 110 will be described. FIG. 3 is a functional block diagram illustrating a configuration of the controller enclosure 110 according to the second embodiment. As illustrated in FIG. 3, the controller enclosure 110 is connected communicably to an external apparatus 50 such as the host computer 40 through a data I/F line 60. Here, the data I/F line 60 is used for transmitting data to be exchanged with the controller enclosure 110.

The controller enclosure 110 is connected communicably to the disk enclosure 120 through an upper data input line 31 and an upper data output line 32. Here, the upper data input line 31 transmits in one direction the data to be input from the controller enclosure 110 to the disk enclosure 120. The upper data output line 32 transmits in one direction the data to be output from the disk enclosure 120 to the controller enclosure 110.

According to the second embodiment, the data transmission lines provided between the controller enclosure 110 and the disk enclosure 120 are differential signal lines of two signal lines. The data transmission lines here are the upper data input line 31 and upper data output line 32. In SAS, two pairs of differential signal lines are handled as one channel, and signal lines of a total of four channels are used to transmit data. However, FIG. 3 only illustrates signal lines of one channel.

According to the second embodiment, the differential signal lines perform communication in common mode. Further according to the second embodiment, a predetermined amount of DC voltage is superimposed on each of the data transmission lines, as will be described below in detail. Hereinafter, the predetermined amount of DC voltage to be superimposed on each data transmission line is called a DC offset voltage.

The controller enclosure 110 has an apparatus controller 111, s system controller 112, a power circuit 113, a DC-voltage superimposer 114, a DC voltage detector 115 and a power controller 116. The apparatus controller 111, power circuit 113, DC-voltage superimposer 114, DC voltage detector 115 and power controller 116 operate properly with power supplied from a standby power, not shown. In other words, the apparatus controller 111, power circuit 113, DC-voltage superimposer 114, DC voltage detector 115, and power controller 116 operate properly even when the system controller 112 is not running.

The apparatus controller 111 controls the system device 112 on the basis of an access request transmitted from the external apparatus 50. The apparatus controller 111 exchanges data and/or a control command with the system device 112 via an internal bus 117.

The system controller 112 controls an access request from the external apparatus 50 to an HDD in the disk enclosure 120. The system controller 122 transfers data and a control command, which are transmitted from the apparatus controller 111 via the internal bus 117, to the disk enclosure 120 through the upper data input line 31. The system controller 112 transfers data transmitted from the disk enclosure 120 through the upper data output line 32 to the apparatus controller 111 via the internal bus 117. According to the second embodiment, the system controller 112 is an SAS controller.

The power circuit 113 supplies power supplied from a main power, not shown, to components within a housing of the controller enclosure 110 under the control of the power controller 116, which will be described below.

The DC-voltage superimposer 114 instructs the disk enclosure 120 to power on or power off under the control of the power controller 116, which will be described below. The DC-voltage superimposer 114 superimposes a predetermined amount of DC offset voltage onto the upper data input line 31 to instruct the disk enclosure 120 to power on.

The DC-voltage superimposer 114 stops the superimposition of the DC offset voltage onto the upper data input line 31 to instruct the disk enclosure 120 to power off under the control of the power controller 116, which will be described below. For the transition to powering off of the entire storage system 100, the DC-voltage superimposer 114 stops the superimposition of the DC offset voltage onto the upper data input line 31 while the DC voltage detector 115, which will be described below, is detecting the DC offset voltage superimposed onto the upper data output line 32.

The DC voltage detector 115 detects whether the DC offset voltage is superimposed on the upper data output line 32 or not.

The power controller 116 drives the power circuit 113 to supply power to components in the controller enclosure 110. If an operator, for example, instructs to power on, the power controller 116 instructs the DC-voltage superimposer 114 to superimpose a DC offset voltage. If the power controller 116 receives an instruction to power off from an operator while the DC voltage detector 115 is detecting the DC offset voltage, the power controller 116 instructs the DC-voltage superimposer 114 to stop the DC offset voltage.

Figure 4:
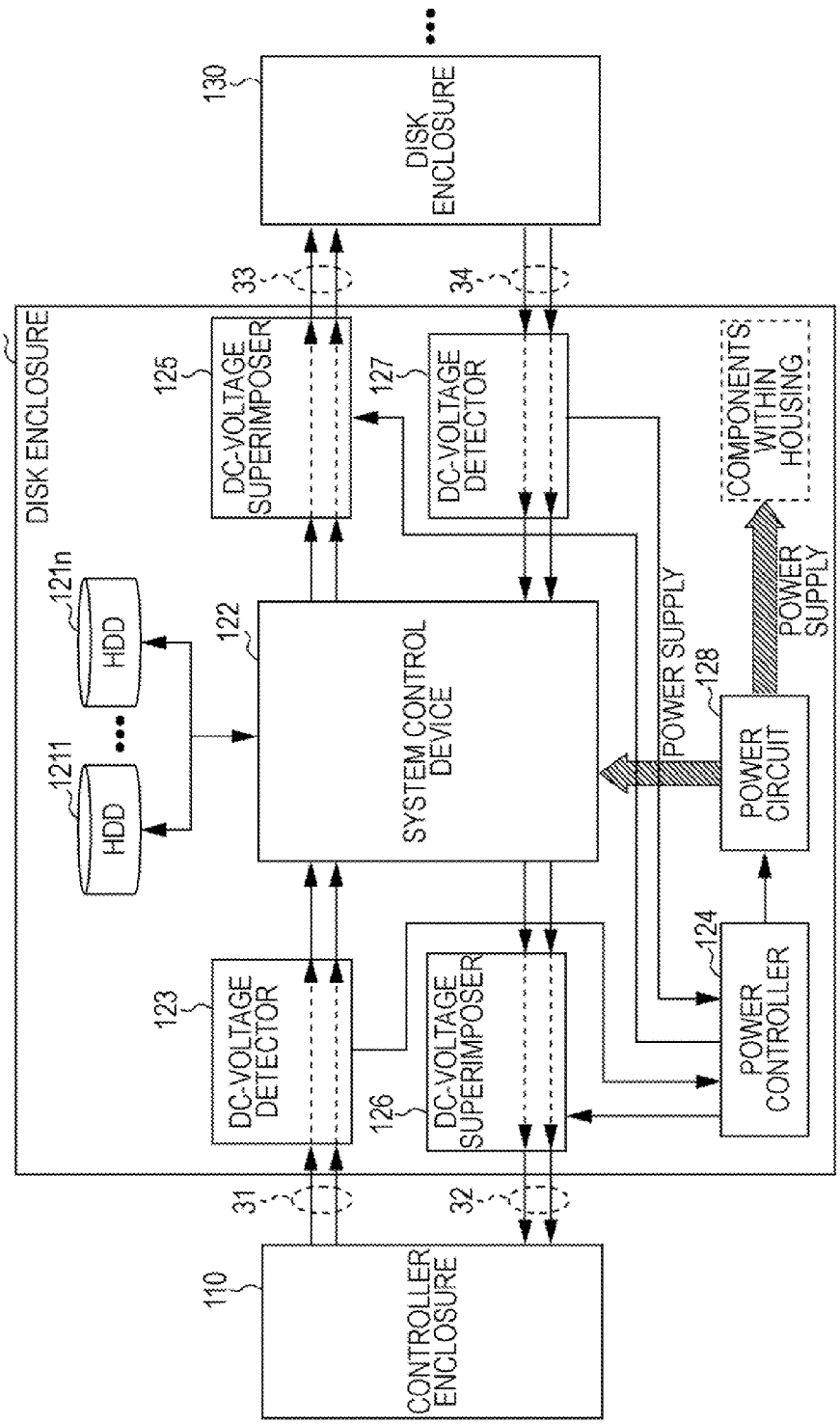
FIG. 4 is a functional block diagram illustrating a configuration of a disk enclosure according to the second embodiment.

Next, configurations of the disk enclosures will be described. Since each of the disk enclosures in the storage system 100 has the same configuration, the disk enclosure 120 will be described, for example. FIG. 4 is a functional block diagram illustrating a configuration of the disk enclosure 120 according to the second embodiment.

As illustrated in FIG. 4, the disk enclosure 120 is connected communicably to the controller enclosure 110 through the upper data input line 31 and upper data output line 32.

The disk enclosure 120 is connected communicably to the disk enclosure 130 through the lower data output line 33 and lower data input line 34. Here, the lower data output line 33 transmits in one direction the data to be input from the disk enclosure 120 to the disk enclosure 130. The lower data input line 34 transmits in one direction the data to be output from the disk enclosure 130 to the disk enclosure 120. The disk enclosure 130 is also connected to other disk enclosures, not shown, in the same manner.

According to the second embodiment, the data transmission lines provided between neighboring disk enclosures are differential signal lines of two signal lines. The data transmission lines here are the upper data input line 31, upper data output line 32, lower data output line 33 and lower data input line 34. In SAS, two pairs of differential signal lines are handled as one channel, and signal lines of a total of four channels are used to transmit data. However, FIG. 4 only illustrates signal lines for one channel. According to the second embodiment, the differential signal lines perform communication in common mode as described above. A DC offset voltage is superimposed on each of the data transmission lines.

The disk enclosure 120 has HDDs 1211 to 121n, a system controller 122, a power circuit 128, DC voltage detectors 123 and 127, DC-voltage superimposers 125 and 126, and a power controller 124. Here, the power circuit 128, DC voltage detector 123 and 127, DC-voltage superimposer 125 and 126, and power controller 124 operate properly with power supplied from a standby power, not shown. In other words, the power circuit 128, DC voltage detectors 123 and 127, DC-voltage superimposers 125 and 126, and power controller 124 operate properly even when the system controller 122 is not running.

The HDDs 1211 to 121n store data.

The system controller 122 controls access requests from the controller enclosure 110 to the HDDs 1211 to 121n. The system controller 122 transfers data transmitted from the controller enclosure 110 through the upper data input line 31 to the disk enclosure 130 through the lower data output line 33. The system controller 122 further transfers data transmitted from the disk enclosure 130 through the lower data input line 34 to the controller enclosure 110 through the upper data output line 32. According to the second embodiment, the system controller 122 is an SAS expander.

The power circuit 128 supplies power supplied from a main power, not shown, to components within the housing of the disk enclosure 120 under the control of the power controller 124, which will be described below.

The DC voltage detector 123 detects whether a DC offset voltage is superimposed on the upper data input line 31 or not. The DC voltage detector 127 detects whether a DC offset voltage is superimposed on the lower data input line 34 or not.

If the power controller 124 powers on the system controller 122, which will be described below, the DC-voltage superimposer 125 superimposes a DC offset voltage on the lower data output line 33. If the power controller 124 stops the power supply to the system controller 122, which will be described below, the DC-voltage superimposer 125 stops the superimposition of the DC offset voltage on the lower data output line 33.

If the fact that a DC offset voltage is superimposed on the lower data input line 34 and if the power supply to the system controller 122 is stoppable, the DC-voltage superimposer 126 superimposes the DC offset voltage to the upper data output line 32. The state that the power supply to the system controller 122 is stoppable is obtained when the state the system controller 122 is not exchanging data with other apparatuses continues for a predetermined period of time or longer, for example.

In other words, only if the power supply is stoppable in all subsequently connected disk enclosures including the disk enclosure 120, the DC-voltage superimposer 126 superimposes the DC offset voltage onto the upper data output line 32. When the disk enclosure 120 is positioned at the end of a plurality of disk enclosures and if the power supply to the system controller 122 is stoppable, the DC-voltage superimposer 126 superimposes the DC offset voltage on the upper data output line 32.

The power controller 124 drives the power circuit 128 to supply power to components in the disk enclosure 120. If the DC voltage detector 123 detects that a DC offset voltage is superimposed on the upper data input line 31, the power controller 124 powers on and starts the system controller 122. If the DC voltage detector 123 detects that a DC offset voltage is not superimposed on the upper data input line 31, the power controller 124 stops the power supply to the system controller 122. The control to be performed by the power controller 124 will be described in detail below.

Figure 5:
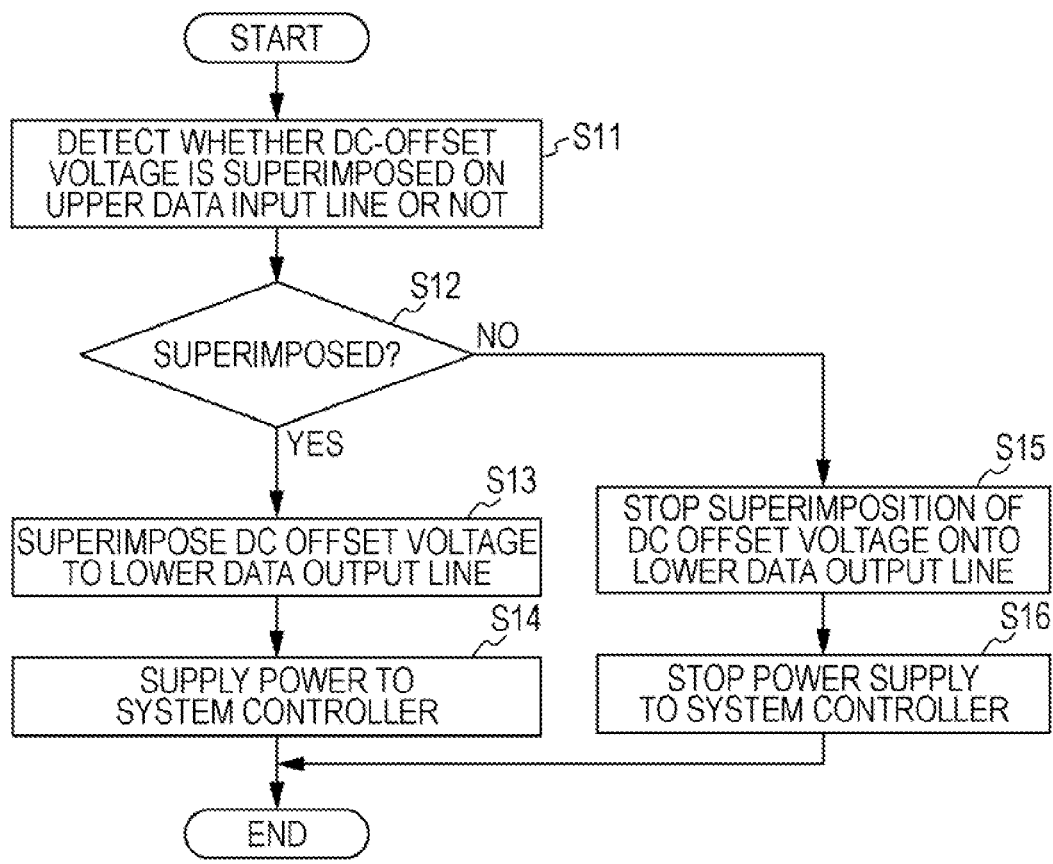
FIG. 5 is a flowchart (1) illustrating a processing routine in the disk enclosure according to the second embodiment.
Figure 6:
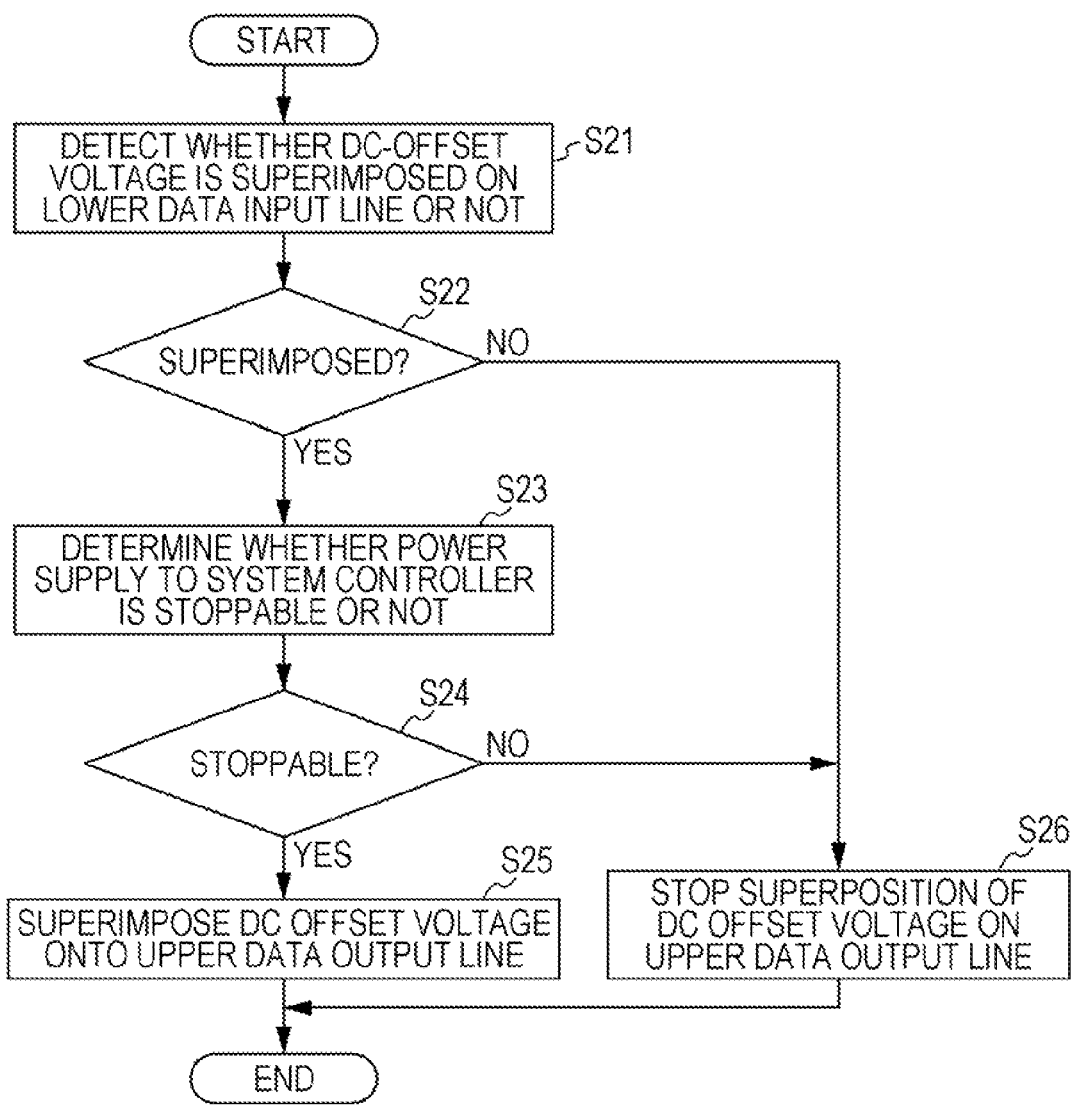
FIG. 6 is a flowchart (2) illustrating a processing routine in the disk enclosure according to the second embodiment.

Next, processing routines in the disk enclosure 120 according to the second embodiment will be described. FIGS. 5 and 6 are flowcharts illustrating processing routines in the disk enclosure 120 according to the second embodiment. With reference to FIG. 5, processing based on a DC offset voltage to be superimposed on the upper data input line 31 will be described. With reference to FIG. 6, processing based on a DC offset voltage to be superimposed on the lower data input line 34 will be described. In the processing routines, which will be described below, the transition of control between components in the disk enclosure 120 is controlled by the power controller 124.

As illustrated in FIG. 5, in the disk enclosure 120, the DC voltage detector 123 detects whether a DC offset voltage is superimposed on the upper data input line 31 or not (step S11).

If it is detected that a DC offset voltage is superimposed (Yes in step S12), the power controller 124 instructs the DC-voltage superimposer 125 to superimpose the DC offset voltage onto the lower data output line 33 (step S13). The power controller 124 drives the power circuit 128 to supply power to the system controller 122 (step S14). The DC-voltage superimposer 125 monitors the state of the system controller 122, and if the power controller 124 detects that power is supplied to the system controller 122, for example, the DC offset voltage may be superimposed on the lower data output line 33.

On the other hand, if it is detected that a DC offset voltage is not superimposed (No in step S12), the power controller 124 instructs the DC-voltage superimposer 125 to stop the superimposition of a DC offset voltage onto the lower data output line 33 (step S15). The power controller 124 drives the power circuit 128 to stop power supply to the system controller 122 (step S16).

As illustrated in FIG. 6, in the disk enclosure 120, the DC voltage detector 127 detects whether a DC offset voltage is superimposed on the lower data input line 34 or not (step S21).

If it is detected that a DC offset voltage is superimposed on the lower data input line 34 (Yes in step S22), the power controller 124 determines whether the power supply to the system controller 122 is stoppable or not (step S23). If it is determined that the power supply is stoppable (Yes in step S24), the DC-voltage superimposer 125 superimposes the DC offset voltage onto the upper data output line 32 (step S25).

On the other hand, if it is not detected that a DC offset voltage is superimposed on the lower data input line 34 (No in step S22), the power controller 124 drives the power circuit 128 to stop the power supply to the system controller 122 (step S26). Also if it is determined that the power supply to the system controller 122 is not stoppable (No in step S24), the power controller 124 stops the power supply to the system controller 122 (step S26).

Figure 7:
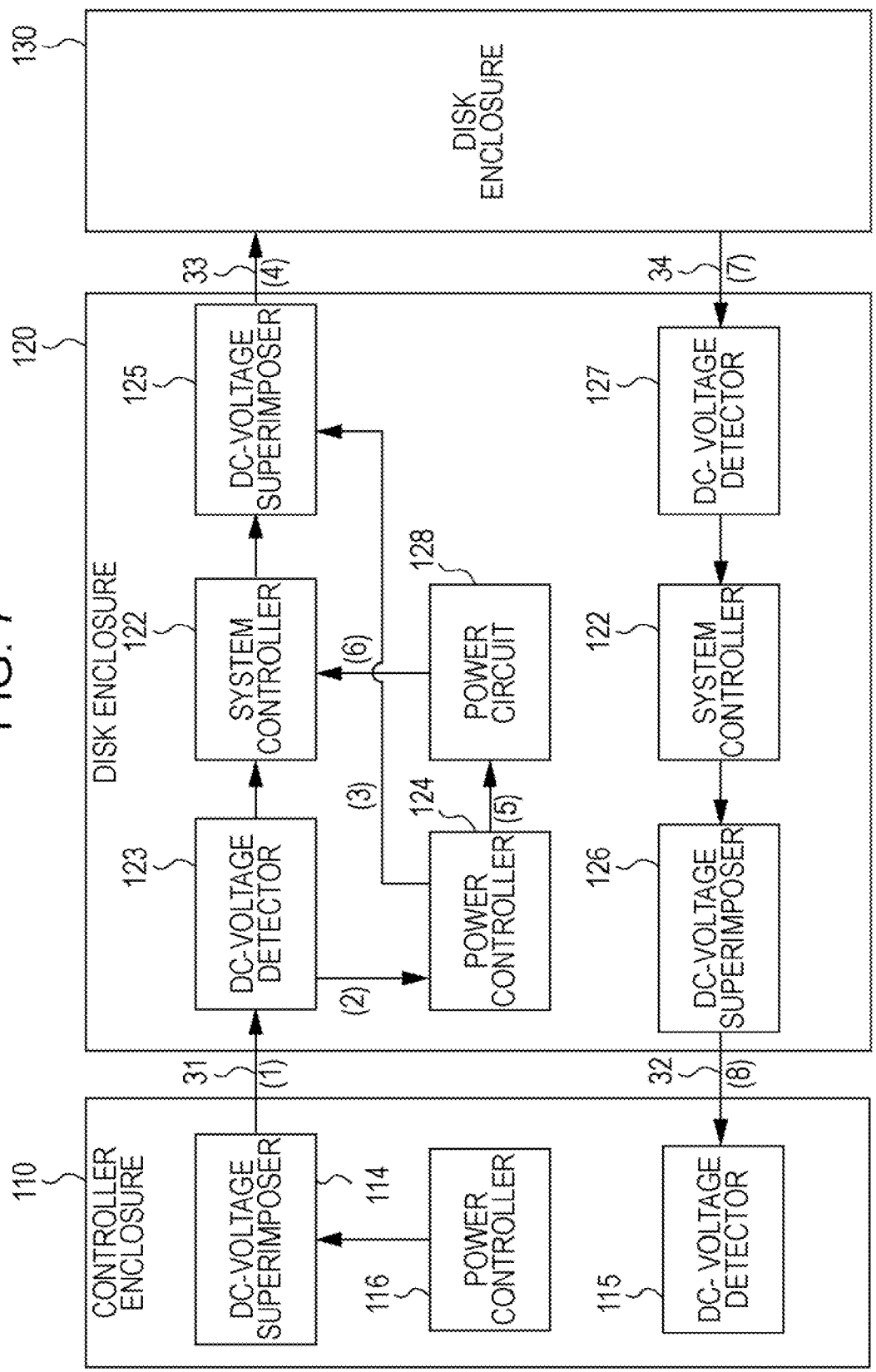
FIG. 7 is a diagram (1) for explaining a flow of power interlocking in a storage system according to the second embodiment.
Figure 8:
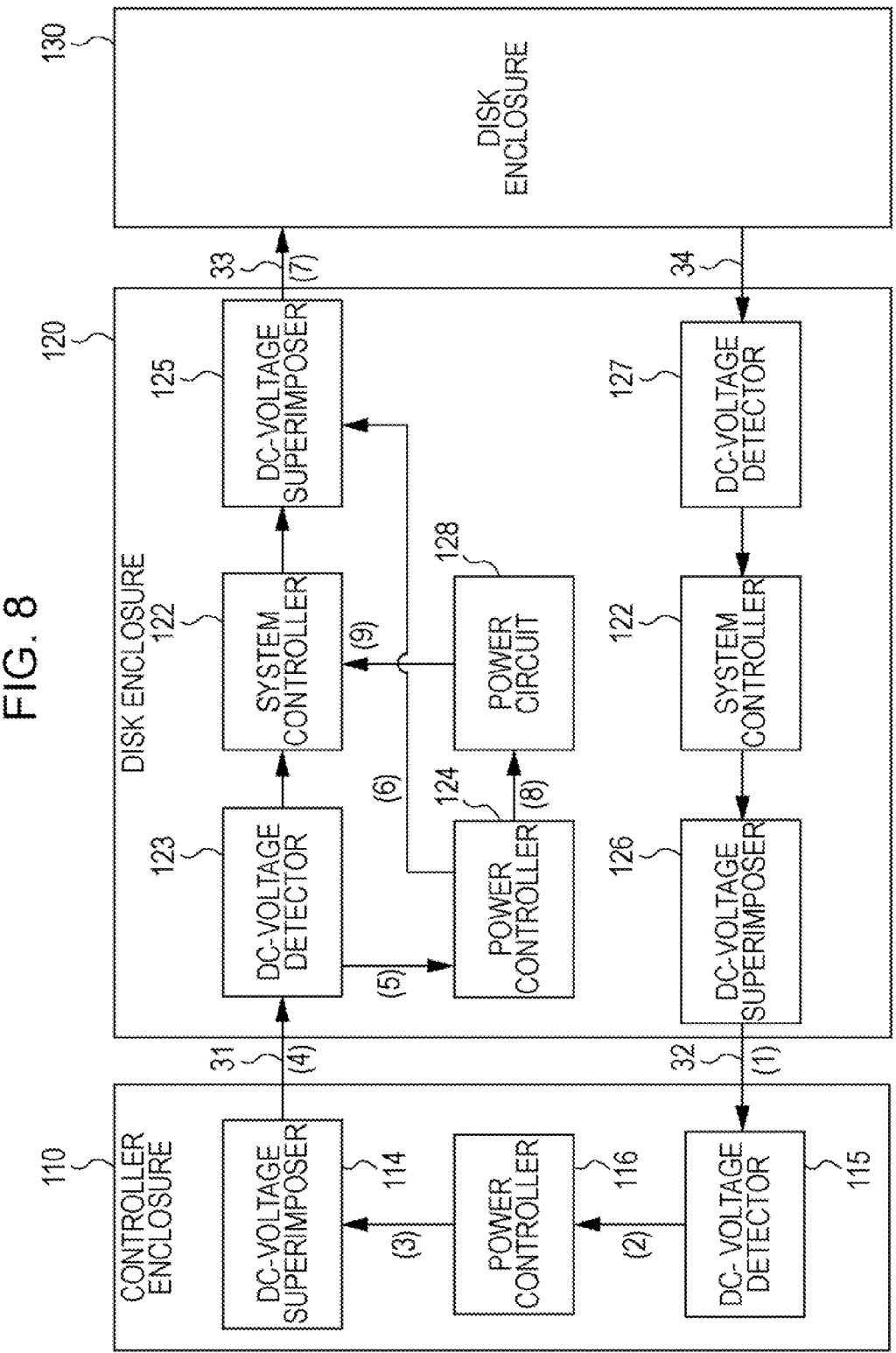
FIG. 8 is a diagram (2) for explaining a flow of power interlocking in the storage system according to the second embodiment.

Next, a flow of power interlocking in the storage system 100 according to the second embodiment will be described. FIGS. 7 and 8 are diagrams illustrating flows of power interlocking in the storage system 100 according to the second embodiment. With reference to FIG. 7, a flow for powering on will be described. With reference to FIG. 8, a flow for powering off will be described. Hereinafter, the powering on and off in the disk enclosure 120 will be mainly described, and parts not described hereinafter are not illustrated in the drawings. FIGS. 7 and 8 divide the system controller 122 into two for convenience of illustration.

As illustrated in FIG. 7, in the controller enclosure 110 after powered on, the DC-voltage superimposer 114 superimposes a DC offset voltage onto the upper data input line 31 in accordance with the instruction from the power controller 116. (Refer to (1) in FIG. 7).

After that, in the disk enclosure 120, the DC voltage detector 123 detects that a DC offset voltage is superimposed on the upper data input line 31. The DC voltage detector 123 notifies the fact that a DC offset voltage has been detected to the power controller 124. (Refer to (2) in FIG. 7).

If the fact that a DC offset voltage has been detected is notified from the DC voltage detector 123, the power controller 124 first instructs the DC-voltage superimposer 125 to superimpose the DC offset voltage onto the lower data output line 33. (Refer to (3) in FIG. 7). The instruction by the power controller 124 here to superimpose the DC offset voltage onto the DC-voltage superimposer 125 allows immediate instruction to power on the disk enclosure 130 without waiting for the start of the system controller 122.

If instructed to superimpose the DC offset voltage by the power controller 124, the DC-voltage superimposer 125 superimposes the DC offset voltage onto the lower data output line 33 to instruct to power on the disk enclosure 130. (Refer to (4) in FIG. 7). This starts the system controller in the disk enclosure 130.

When the fact that a DC offset voltage has been detected is notified from the DC voltage detector 123, the power controller 124 instructs the power circuit 128 to power on the system controller 122. (Refer to (5) in FIG. 7). If instructed by the power controller 124 to power on the system controller 122, the power circuit 128 starts the power supply to the system controller 122. (Refer to (6) in FIG. 7). This starts the system controller 122 in the disk enclosure 120.

If the disk enclosure 130 is stoppable, the DC offset voltage is superimposed on the lower data input line 34. (Refer to (7) in FIG. 7). After that, in the disk enclosure 120, the DC voltage detector 127 detects that a DC offset voltage is superimposed on the lower data input line 34. If the DC voltage detector 127 detects the DC offset voltage and the power supply to the system controller 122 is stoppable, the DC-voltage superimposer 126 superimposes the DC offset voltage to the upper data output line 32. (Refer to (8) in FIG. 7).

As illustrated in FIG. 8, in the controller enclosure 110 after powered off, the DC voltage detector 115 detects that a DC offset voltage is superimposed on the upper data output line 32. (Refer to (1) in FIG. 8). Then, the DC voltage detector 115 notifies that a DC offset voltage has been detected to the power controller 116. (Refer to (2) in FIG. 8).

If receiving a power-off instruction while the power controller 116 is being notified from the DC voltage detector 115 of the fact that a DC offset voltage has been detected, the power controller 116 instructs the DC-voltage superimposer 114 to stop the DC offset voltage. (Refer to (3) in FIG. 8). If instructed by the power controller 116 to stop the DC offset voltage, the DC-voltage superimposer 114 stops the superimposition of the DC offset voltage onto the upper data input line 31 to instruct to power off the disk enclosure 120. (Refer to (4) in FIG. 8).

After that, in the disk enclosure 120, the DC voltage detector 123 detects that a DC offset voltage is not superimposed on the upper data input line 31. The DC voltage detector 123 then notifies that the DC offset voltage has been lost to the power controller 124. (Refer to (5) in FIG. 8).

If notified the fact that the DC offset voltage has been lost from the DC voltage detector 123, the power controller 124 first instructs the DC-voltage superimposer 125 to stop the superimposition of the DC offset voltage onto the lower data output line 33. (Refer to (6) in FIG. 8). The instruction by the power controller 124 here to superimpose a DC offset voltage onto the DC-voltage superimposer 125 allows immediate instruction to power on the disk enclosure 130 without waiting for the start of the system controller 122.

If instructed to stop the DC offset voltage by the power controller 124, the DC-voltage superimposer 125 stops the superimposition of the DC offset voltage onto the lower data output line 33 to instruct to power off the disk enclosure 130. (Refer to (7) in FIG. 8). This powers off the system controller in the disk enclosure 130.

When the fact that the DC offset voltage has been lost is notified from the DC voltage detector 123, the power controller 124 instructs the power circuit 128 to power off the system controller 122. (Refer to (8) in FIG. 8). If instructed by the power controller 124 to power off the system controller 122, the power circuit 128 stops the power supply to the system controller 122. (Refer to (9) in FIG. 8). This powers off the system controller 122 in the disk enclosure 120.

As described above, according to the second embodiment, the DC-voltage superimposer 114 in the controller enclosure 110 superimposes a DC offset voltage onto the upper data input line 31 to instruct to power on the disk enclosure 120. In the disk enclosure 120, the DC voltage detector 123 detects whether a DC offset voltage is superimposed on the upper data input line 31 or not. If the DC voltage detector 123 detects that a DC offset voltage is superimposed on the upper data input line 31, the power controller 124 powers on and starts the system controller 122.

In other words, according to the second embodiment, the disk enclosure 120 monitors the upper data input line 31 for data transmission. If the controller enclosure 110 superimposes a DC offset voltage to the upper data input line 31, the disk enclosure 120 powers on the system controller 122. Thus, according to the second embodiment, the power consumption at a standby state can be suppressed, and power interlocking between apparatuses can be implemented, without using a signal for power control.

According to the second embodiment, the storage system 100 is connected communicably to the disk enclosure 120 and has the disk enclosure 130 having the same configuration as the disk enclosure 120. In the disk enclosure 120, if the power controller 124 powers on the system controller 122, the DC-voltage superimposer 125 superimposes a DC offset voltage on the lower data output line 33. Thus, according to the second embodiment, when a plurality of disk enclosures are connected in a multi-stage manner, power interlocking can be provided between all apparatuses. Also according to the second embodiment, since simple control by turning on/off a DC offset voltage can implement the power interlocking, the time required for power interlocking can be reduced in the entire system.

According to the second embodiment, in the controller enclosure 110, the DC-voltage superimposer 114 stops the superimposition of a DC offset voltage on the upper data input line 31 to instruct to power off the disk enclosure 120. In the disk enclosure 120, if the DC voltage detector 123 detects that a DC offset voltage is not superimposed on the upper data input line 31, the power controller 124 stops the power supply to the system controller 122. Therefore, according to the second embodiment, apparatuses are powered off in an interlocking manner, without use of a signal for power control.

According to the second embodiment, in the disk enclosure 120, if the power supply to the system controller 122 is stoppable, the DC-voltage superimposer 126 superimposes a DC offset voltage on the upper data output line 32. In the controller enclosure 110, the DC voltage detector 115 detects a DC offset voltage is superimposed on the upper data output line 32 or not. If the DC voltage detector 115 detects that a DC offset voltage is superimposed on the upper data output line 32, the DC-voltage superimposer 114 stops the superimposition of the DC offset voltage onto the upper data input line 31. Thus, according to the second embodiment, since the state of a subsequent disk enclosure is monitored and then the powering off is instructed, invalid powering off of the subsequent apparatuses can be prevented.

According to the second embodiment, the storage system 100 is connected communicably to the disk enclosure 120 and has the disk enclosure 130 having the same configuration as that of the disk enclosure 120. In the disk enclosure 120, if the power controller 124 stops the power supply to the system controller 122, the DC-voltage superimposer 125 stops the superimposition of the DC offset voltage onto the lower data output line 33. Thus, according to the second embodiment, when a plurality of disk enclosures are connected in a multi-stage manner, all disk enclosures can be powered off in an interlocking manner.

According to the second embodiment, in the disk enclosure 120, the DC voltage detector 127 detects whether a DC offset voltage is superimposed on the lower data input line 34 or not. If the fact that a DC offset voltage is superimposed on the lower data input line 34 is detected and if the power supply to the system controller 122 is stoppable, the DC-voltage superimposer 126 superimposes the DC offset voltage onto the upper data output line 32. In other words, according to the second embodiment, when a plurality of disk enclosures are connected in a multi-stage manner, all disk enclosures are powered off in an interlocking manner only when it is possible. This, according to the second embodiment, can prevent the situation that partial apparatuses within the system are left without powered off. Therefore, the apparatuses can be powered off more securely.

According to the second embodiment, the powering on and off are switched in accordance with whether a DC offset voltage is superimposed on the upper data input line 31 or not. However, for example, in accordance with whether the DC offset voltage superimposed on the upper data input line 31 is positive voltage or negative voltage, the powering on and off may be switched.

In that case, for example, in the controller enclosure 110, the DC-voltage superimposer 114 may switch the DC offset voltage to positive voltage or negative voltage before the DC offset voltage is superimposed on the upper data input line 31. In other words, the DC-voltage superimposer 114 may switch the DC offset voltage to positive voltage or negative voltage by instructing to power on or power off the disk enclosure 120.

For example, in the disk enclosure 120, the DC voltage detector 123 detects whether the DC offset voltage superimposed on the upper data input line 31 is positive voltage or negative voltage. In accordance with whether the voltage detected by the DC voltage detector 123 is positive voltage or negative voltage, the power controller 124 supplies power or stops the power supply to the system controller 122.

According to the second embodiment, in accordance with whether a DC offset voltage is superimposed on the upper data output line 32 or not, whether the power supply to the system controller 122 is stoppable or not is determined. However, for example, in accordance with whether the DC offset voltage superimposed on the upper data output line 32 is positive voltage or negative voltage, whether the power supply to the system controller 122 is stoppable or not may be determined. In that case, for example, in the disk enclosure 120, the DC offset voltage to be superimposed on the upper data output line 32 by the DC-voltage superimposer 126 may be switched to positive voltage or negative voltage. In order to do so, the DC-voltage superimposer 126 switches the DC offset voltage to positive voltage or negative voltage in accordance with the power supply to the system controller 122 is stoppable or not.

For example, in the controller enclosure 110, the DC voltage detector 115 detects whether the DC offset voltage superimposed on the upper data output line 32 is positive voltage or negative voltage. In accordance with whether the voltage detected by the DC voltage detector 115 is positive voltage or negative voltage, the DC-voltage superimposer 114 starts or stops superimposition of the DC offset voltage onto the upper data input line 31.

According to the second embodiment, in the controller enclosure 110, the DC-voltage superimposer 114 superimposes a DC offset voltage onto the upper data input line 31 to instruct to power on the disk enclosure 120. The DC-voltage superimposer 114 stops the superimposition of a DC offset voltage onto the upper data input line 31 to instruct to power off the disk enclosure 120. Thus, during the period from the instruction to power on the DC-voltage superimposer 114 to the instruction to power off, the DC offset voltage is kept superimposed on the upper data input line 31.

However, for example, the DC offset voltage may be superimposed for a predetermined period of time. In this case, for example, the controller enclosure 110 superimposes a DC offset voltage onto the upper data input line 31 only for corresponding predetermined periods of time in order to instruct to power on and power off. On the other hand, the disk enclosure 120 switches between the power supply and powering off every time when a DC offset voltage is superimposed on the upper data input line 31. This can reduce the time for superimposing a DC offset voltage, the power consumption by the application of the DC offset voltage can be reduced.

Having described that the DC offset voltage for instructing to power on and power off, the period for applying the DC offset voltage to be superimposed on the upper data output line 32 by the disk enclosure 120 can also be reduced. In that case, however, the controller enclosure 110 pre-holds information describing whether the power supply to the system controller 122 is stoppable or not in a state-holdable storage such as a logical circuit and a memory every time when a DC offset voltage is superimposed. Thus, the controller enclosure 110 may refer to the information held in the storage to determine whether the instruction to power off the disk enclosure 120 is possible or not.

According to the second embodiment, two pairs of differential signal lines are handled as one channel, and signal lines for a total of four channels are provided between apparatuses. For example, the apparatus that superimposes a DC offset voltage to a data transmission line may superimpose voltage on only one of differential signal lines or may superimpose voltage on both of the two differential signal lines. Thus, the apparatus that superimposes a DC offset voltage may superimpose voltage only on partial signal lines, instead of the superimposition of voltage to all signal lines. It can reduce the power consumption.

In the data transmission using differential signal lines, a signal indicating data is transmitted at opposite phases from each other to two signal lines in order to increase the quality of data communication. In that case, the apparatus (more specifically, system controller) that receives the signal calculates the relative value of the signal transmitted at the opposite phases and decodes the data on the basis of the calculated relative value. In this case, the apparatus that superimposes a DC offset voltage on data transmission lines may apply voltages having opposite potentials to two signal lines, for example. Thus, the apparatus that detects a DC offset voltage may calculate the relative value so that the DC offset voltage can be detected with higher precision.

When a DC offset voltage is superimposed on two signal lines, the apparatus that detects the DC offset voltage may detect the DC offset voltage on the basis of the voltage values of the signal lines, for example. In this case, for example, the apparatus that detects a DC offset voltage regards the voltage superimposed on the signal lines as noise if only one of the two signal lines has high voltage. In other words, the apparatus that detects a DC offset voltage determines that a DC offset voltage is not superimposed on the signal lines if only one of the two signal lines has high voltage.

The apparatus that superimposes a DC offset voltage onto data transmission lines may superimpose a DC offset voltage only on one channel of the four channels, for example. Alternatively, for example, the apparatus that superimposes a DC offset voltage on data transmission lines may superimpose a DC offset voltage on two or more predetermined number of channels. In this case, for example, the apparatus that detects a DC offset voltage may detect that a DC offset voltage is superimposed on data transmission lines only if all of a predetermined number of channels have high voltage.

What is claimed is:

1. A storage system comprising:
   a basic apparatus that transmits an access request through an upper data input line to transmit data; and
   an extension apparatus that receives an access request from the basic apparatus through the upper data input line, the extension apparatus including a storage that stores data and a controller that controls the access request from the basic apparatus,
   the basic apparatus includes a first voltage superimposer that superimposes a voltage to the upper data input line to instruct the extension apparatus to be powered on in accordance with the access request and a first voltage detector that detects a specified voltage superimposed on an upper data output line to transmit data from the extension apparatus to the basic apparatus, and
   the extension apparatus includes
   a second voltage detector that detects the voltage superimposed on the data input line,
   a power controller that controls the power supply to the controller on the basis of the detected voltage, and
   a second voltage superinnposer that superimposes the specified voltage on the upper data output line when power supply to the controller is stoppable, and
   the basic apparatus stops superimposing the voltage to the upper data input line to instruct to power off the extension apparatus when the first voltage detector detects that the specified voltage on the upper data output line is superimposed.

2. The storage system of claim 1, wherein the power controller of the extension apparatus powers on the controller when the second voltage detector detects the superimposed voltage on the upper data input line.

3. The storage system of claim 2 further comprising an additional extension apparatus being connected communicably to the extension apparatus, wherein the extension apparatus comprises a third voltage superimposer to superimpose a specified voltage on a lower data output line to transmit data to the additional extension apparatus when the power controller powers on the controller.

4. The storage system of claim 3 wherein the third voltage superimposer stops superimposing the specified voltage on the lower data output line to transmit data to the additional extension apparatus when the power controller powers off the controller.

5. The storage system of claim 3, wherein the extension apparatus comprises a third voltage detector that detects superimposition of a specified voltage on a lower data input line that transmits data from the additional extension apparatus, and wherein the second voltage superimposer superimposes the specified voltage on the upper data output line when the third voltage detector detects superimposition of the specified voltage on the lower data input line and the power supply to the controller is stoppable.

6. The storage system of claim 2, wherein the power controller of the extension apparatus powers off the controller when the extension apparatus detects stopping the superimposition of the specified voltage on the upper data input line.

* * * * *